United States Patent
Akamine et al.

(10) Patent No.: US 11,014,518 B2
(45) Date of Patent: May 25, 2021

(54) ESTIMATION DEVICE

(71) Applicants: SOKEN, INC., Nisshin (JP); DENSO CORPORATION, Kariya (JP)

(72) Inventors: Yusuke Akamine, Nisshin (JP); Mitsuyasu Matsuura, Nisshin (JP); Mai Sakamoto, Kariya (JP)

(73) Assignees: SOKEN, INC., Aichi-pref. (JP); DENSO CORPORATION, Aichi-pref. (JP)

( * ) Notice: Subject to any disclaimer, the term of this patent is extended or adjusted under 35 U.S.C. 154(b) by 102 days.

(21) Appl. No.: 16/098,669

(22) PCT Filed: May 2, 2017

(86) PCT No.: PCT/JP2017/017276
§ 371 (c)(1),
(2) Date: Nov. 2, 2018

(87) PCT Pub. No.: WO2017/191841
PCT Pub. Date: Nov. 9, 2017

(65) Prior Publication Data
US 2019/0143925 A1 May 16, 2019

(30) Foreign Application Priority Data
May 6, 2016 (JP) .............................. JP2016-093453

(51) Int. Cl.
| | |
|---|---|
| B60R 21/01 | (2006.01) |
| G01S 13/60 | (2006.01) |
| G01S 13/66 | (2006.01) |
| G01S 13/93 | (2020.01) |
| G08G 1/16 | (2006.01) |
| B60R 21/00 | (2006.01) |

(52) U.S. Cl.
CPC .............. *B60R 21/01* (2013.01); *B60R 21/00* (2013.01); *G01S 13/60* (2013.01); *G01S 13/66* (2013.01); *G01S 13/93* (2013.01); *G08G 1/16* (2013.01); *B60R 2021/01013* (2013.01)

(58) Field of Classification Search
CPC .................... B60R 21/01; B60R 21/00; B60R 2021/01013; G01S 13/60; G01S 13/66; G01S 13/93; G08G 1/16
USPC ........................................................ 342/70
See application file for complete search history.

(56) References Cited

U.S. PATENT DOCUMENTS

2012/0242529 A1* 9/2012 Shimizu ................ G01S 13/931
342/70
2015/0298621 A1* 10/2015 Katoh .................... G08G 1/165
348/148

FOREIGN PATENT DOCUMENTS

JP 2001-272466 A 10/2001

* cited by examiner

*Primary Examiner* — Bo Fan
(74) *Attorney, Agent, or Firm* — Maschoff Brennan

(57) ABSTRACT

An estimation device includes an information acquisition unit, a detection determination unit, a direction determination unit, and a direction estimation unit. When an object is a first-time detected object, the direction determination unit determines whether a relative direction acquired by the information acquisition unit is a direction toward an own vehicle. When the relative direction acquired by the information acquisition unit is a direction toward the own vehicle, the direction estimation unit estimates that a direction predetermined according to an object position acquired by the information acquisition unit is the movement direction of the object.

6 Claims, 5 Drawing Sheets

ESTIMATION DEVICE

CROSS-REFERENCE TO RELATED APPLICATION

This patent application is a national stage application of PCT Application No. PCT/JP2017/017276, filed on May 2, 2017, which is filed to claim for priority based on Japanese Patent Application No. 2016-093453 filed on May 6, 2016 in the Japan Patent Office. The entire disclosure of Japanese Patent Application No. 2016-093453 is incorporated herein by reference.

TECHNICAL FIELD

The present disclosure relates to a technique for estimating the movement direction of an object.

BACKGROUND ART

PTL 1 describes a technique for estimating the movement direction of an object by transmitting and receiving radar waves to acquire the distance and azimuth to the object a plurality of times with the passage of time. The radar waves include millimeter waves, laser waves, ultrasonic waves, and others, for example.

CITATION LIST

Patent Literature

[PTL 1] JP 2001-272466 A

SUMMARY OF THE INVENTION

According to the technique described in PTL 1, the movement direction of an object is estimated by acquiring the detection results a plurality of times. However, the inventor's detailed study has revealed that it would take time to estimate the movement direction of an object according to the technique described in PTL 1.

An aspect of the present disclosure is desirably to shorten the time necessary for estimating the movement direction of an object detected for the first time around an own vehicle.

An aspect of the present disclosure is an estimation device that includes an information acquisition unit, a detection determination unit, a direction determination unit, and a direction estimation unit.

The information acquisition unit acquires object information including an object position that indicates the position of an object having reflected a radar wave, the object information being specified by the distance between the object and the own vehicle and the azimuth of the object to the own vehicle and a relative direction that indicates the movement direction of the object relative to the own vehicle.

The detection determination unit determines whether the object is a first-time detected object that is an object detected for a first time. When the object is the first-time detected object, the direction determination unit determines whether the relative direction acquired by the information acquisition unit is a direction toward the own vehicle.

When the relative direction acquired by the information acquisition unit is a direction toward the own vehicle, the direction estimation unit estimates that a direction predetermined according to the object position acquired by the information acquisition unit is the movement direction of the object.

According to this configuration, it is estimated that the direction predetermined according to the object position of the first-time detected object is the movement direction of the object, which makes it possible to estimate the movement direction of the object in a shorter time than in the case of using the technique described in PTL 1.

The reference signs parenthesized in the claims indicate the correspondences with specific units in an embodiment described later as one aspect of the present disclosure but are not intended to limit the technical scope of the present disclosure.

DESCRIPTION OF EMBODIMENTS

Embodiments of the present disclosure will be described below with reference to the drawings.

1. Configuration

Figure 1:
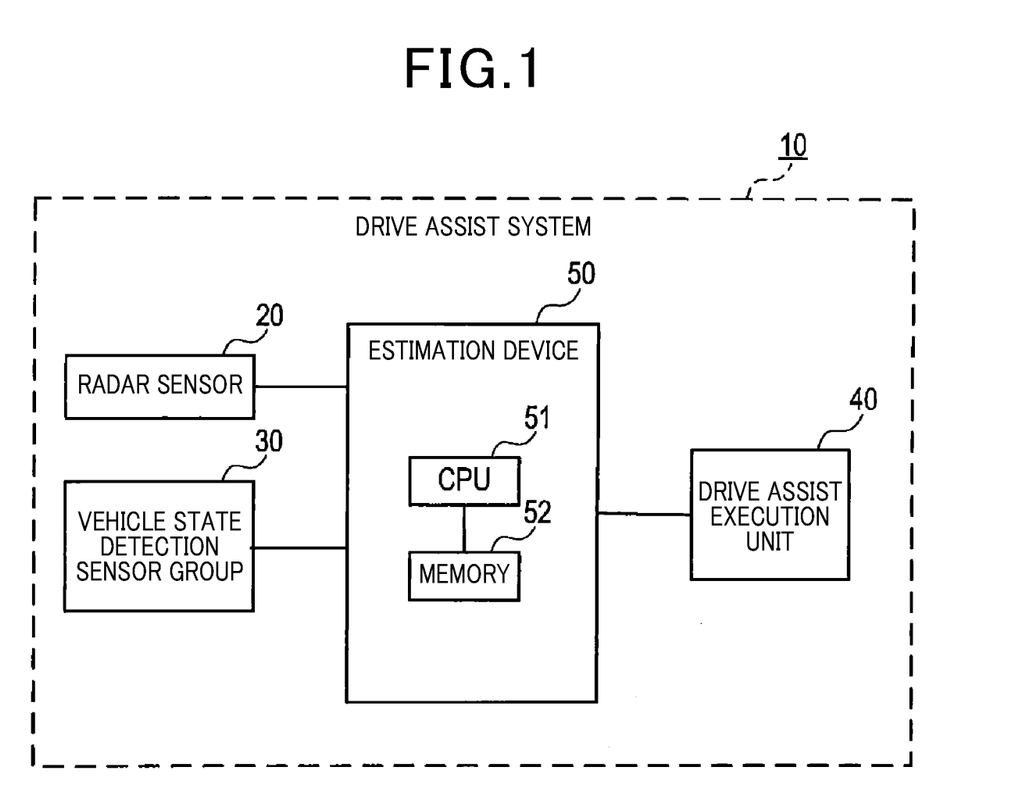
FIG. 1 is a block diagram illustrating a configuration of a drive assist system and an estimation device.

A drive assist system 10 illustrated in FIG. 1 is a system mounted in a vehicle. The drive assist system 10 includes a radar sensor 20, a vehicle state detection sensor group 30, a drive assist execution unit 40, and an estimation unit 50. The own vehicle described below refers to a vehicle equipped with the drive assist system 10.

The radar sensor 20 is installed in a bumper. The bumper is formed from a material permeable to electromagnetic waves. The radar sensor 20 is installed in the front bumper and oriented such that the area on the forward side of the own vehicle falls within its detection range. The forward side here refers to the movement direction of the own vehicle. The backward side refers to the side opposite to the forward side.

The radar sensor 20 transmits and receives radar waves by using an array antenna to detect the distance, relative velocity, azimuth, and reflection intensity within the detection range.

The distance here refers to a distance from the radar sensor 20 to an observation point. The observation point here refers to the position of an object having reflected a radar wave. The object here refers to a moving tangible object. Hereinafter, the object will be described as a vehicle. However, the present disclosure is not limited to this but the foregoing object may be an arbitrary moving tangible object such as a person, for example.

The relative velocity here refers to the velocity of the observation point relative to the radar sensor 20. The azimuth here is represented by the angle to a reference direction. The reference direction is a direction from the position of the radar sensor 20 to the front side of the own vehicle. However, the present disclosure is not limited to this but the reference direction may be a direction from the position of the radar sensor 20 to an arbitrary position. The reflection strength here refers to the strength with which the radar wave reflected on the observation point has been received by the radar sensor 20.

The radar sensor 20 outputs information associated with the distance, relative velocity, azimuth, and reflection strength at each of a plurality of observation points as observation point information to the estimation device 50.

The vehicle state detection sensor group 30 includes a plurality of kinds of sensors that detects the motion state of the own vehicle. The plurality of kinds of sensors includes at least a vehicle velocity sensor and an angular velocity sensor.

The vehicle velocity sensor detects the velocity of the own vehicle. The angular velocity sensor detects the angular velocity of the own vehicle. The angular velocity here refers to the amount of change in the movement direction of the own vehicle per unit time. The unit of the angular velocity is deg/sec. The movement direction here refers to the direction in which the own vehicle moves horizontally. The plurality of kinds of sensors in the vehicle state detection sensor group 30 outputs the detection results to the estimation device 50.

The drive assist execution unit 40 uses one or more kinds of in-vehicle devices to execute one or more kinds of vehicle controls according to instructions output from the estimation device 50. The one or more kinds of vehicle controls may include auditory notification to the driver, visual notification to the driver, and other various kinds of vehicle controls necessary for drive assist. The drive assist execution unit 40 includes at least a display and a speaker.

In the present embodiment, the estimation device 50 is an electronic control device that controls the drive assist system 10. The estimation device 50 includes a microcomputer having a CPU 51 and semiconductor memories such as a RAM, ROM, and a flash memory (hereinafter, called memory 52).

The functions of the estimation device 50 can be implemented by the CPU 51 executing a program stored in a non-transitory tangible computer readable storage medium. For example, the ROM corresponds to the non-transitory tangible computer readable storage medium storing the program. When the program is executed, the method corresponding to the program is executed. The estimation device 50 may include one or more microcomputers.

The method for implementing the functions of the estimation device 50 is not limited to software. Some or all of elements of functions of the estimation device 50 may be implemented by hardware with a combination of a logic circuit and an analog circuit.

The estimation device 50 executes at least a notification process and a drive assist process. The notification process is a process for estimating the movement direction of an object existing within the detection range of the radar sensor 20 and notifying the same. The drive assist process is a process for performing a plurality of kinds of vehicle controls for assisting the driver in driving the vehicle. Various kinds of the drive assist processes are well known and thus descriptions thereof will be omitted, and the notification process will be described below in detail.

2. Process

Figure 2:
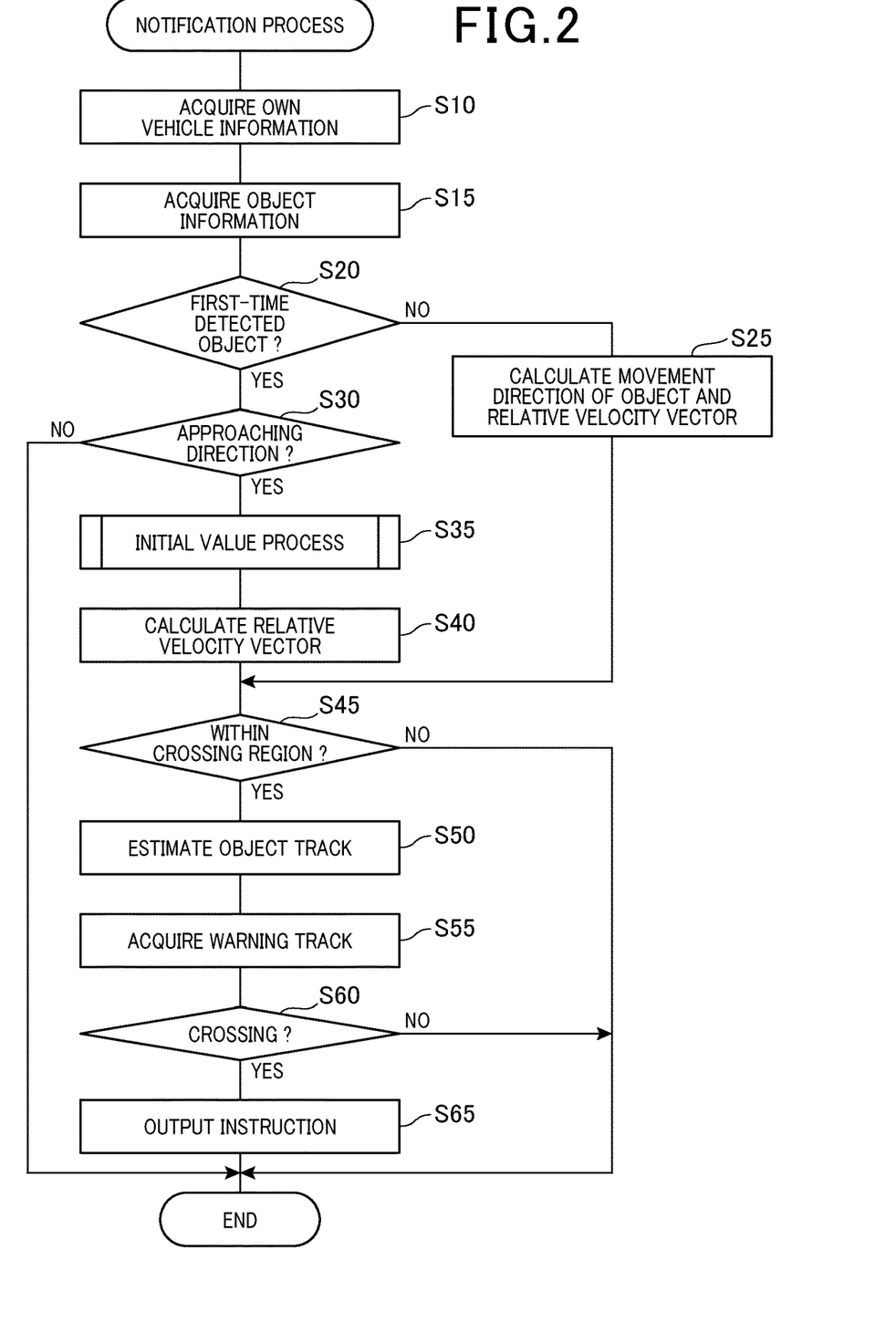
FIG. 2 is a flowchart of a notification process.

The notification process performed by the estimation device 50 will be described with reference to the flowchart in FIG. 2. The notification process is a process for estimating the movement direction of an object detected within the detection range of the radar sensor 20, and providing a notification when there is a possibility that the object moving in the estimated movement direction will approach the own vehicle.

The notification process is initiated at the start of the engine of the own vehicle and is repeatedly performed at predetermined time intervals.

In S10, the estimation device 50 acquires own vehicle information indicating the state of the own vehicle. Specifically, the estimation device 50 acquires the detection results output from the vehicle velocity sensor and the angular velocity sensor as the own vehicle information. The own vehicle information includes at least information indicating the velocity and angular velocity of the own vehicle.

In S15, the estimation device 50 acquires object information. The object information refers to information indicating the object position, relative direction, and relative velocity associated with each of the plurality of observation points. The object position indicates the position of an object having reflected a radar wave. The object position is a position specified by the distance and azimuth to the own vehicle and represented by x, y coordinates with an origin point at an arbitrary position.

Figure 4:
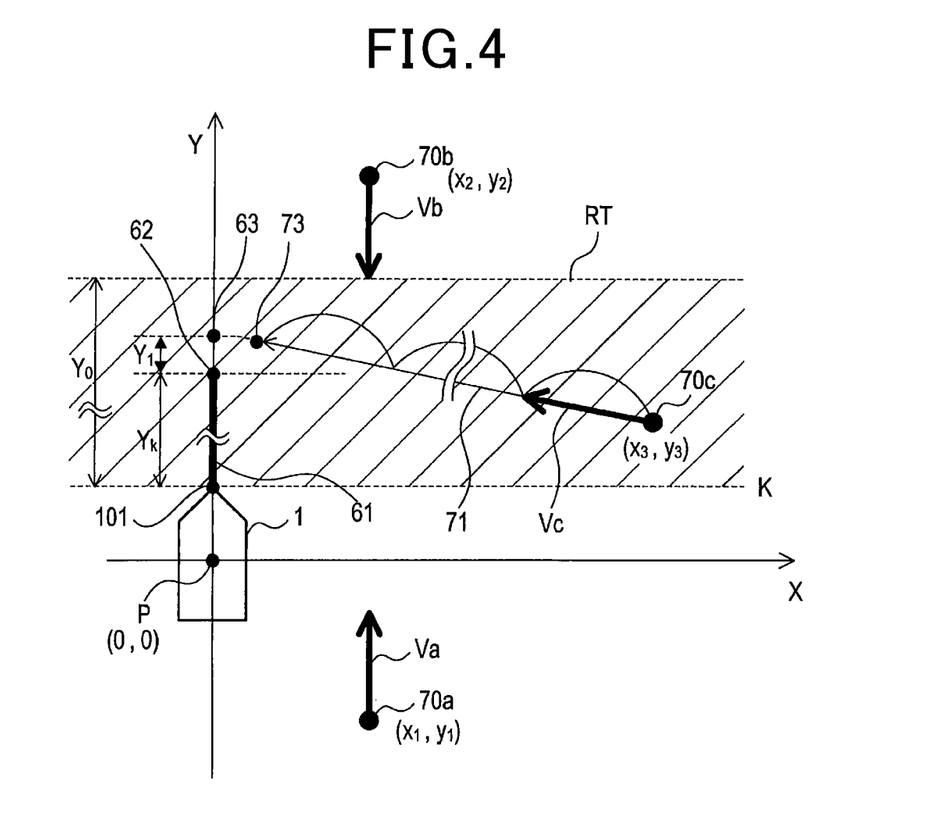
FIG. 4 is a diagram illustrating an initial value of a movement direction set according to a first-time detected position.

The various positions including the object position are represented by the x, y coordinates with an origin point (0, 0) at a position P of the own vehicle 1 as illustrated in FIG. 4 (hereinafter, called own vehicle position P). Referring to FIG. 4, the object positions of objects 70*a* to 70*c* are respectively represented as $(x_1, y_1)$, $(x_2, y_2)$, and $(x_3, y_3)$. Hereinafter, the objects 70*a* to 70*c* will be designated as object 70 in the description applied to them in common.

The relative direction refers to the movement direction of an object having reflected a radar wave, which is relative to the own vehicle 1. In the case of using the Doppler effect, the relative direction of the object having reflected a radar wave is a direction toward the own vehicle 1 or a direction away from the own vehicle 1 on a straight line connecting the object having reflected a radar wave and the own vehicle 1.

The direction toward the own vehicle 1 refers to the direction opposite to the movement direction of the own vehicle 1, and the direction away from the own vehicle 1 refers to the direction identical to the movement direction of the own vehicle 1. In the present embodiment, the direction toward the own vehicle 1 will be designated as positive relative direction, and the direction distant from the own vehicle 1 will be designated as negative relative direction.

FIG. 4 illustrates the movement direction of the own vehicle 1 as the positive direction along the y axis, that is, the forward direction. FIG. 4 illustrates all the relative directions of the objects 70*a* to 70*c* as directions toward the own vehicle 1.

The relative velocity refers to the velocity of the object 70 relative to the own vehicle 1. In the present embodiment, the relative velocity takes a positive value when the relative direction is a positive direction, and takes a negative value when the relative direction is a negative direction.

Specifically, the estimation device 50 calculates the object information based on the observation point information. The estimation device 50 specifies a plurality of observation points between which the difference in distance is shorter than a predetermined threshold, as observation points on the same object (hereinafter, called same-object points). Then, the estimation device 50 calculates the average value of the relative velocities associated with the plurality of specified same-object points. The control unit 50 estimation device 50 uses the average value of the relative velocities as a value indicating the relative velocity of the object 70.

The relative velocity is represented as a relative velocity vector. The relative velocity vector includes magnitude and direction. The magnitude of the relative velocity vector corresponds to the magnitude of the relative velocity, and the direction of the relative velocity vector corresponds to the relative direction described above.

The estimation device 50 also uses the average of the x coordinate values of the plurality of same-object points as the x coordinate value of the object position, and uses the average of the y coordinate values of the plurality of same-object points as the y coordinate value of the object position.

The method for specifying the object information from the observation point information is not limited to this but any other well-known method may be used.

Returning to FIG. 2, in S20, the estimation device 50 determines whether one or more objects detected by the radar sensor 20 include a first-time detected object. The first-time detected object refers to an object detected for the first time by the radar sensor 20. The object detected for the first time refers to an object represented by an observation point at a predetermined distance from one or more observation points detected by the radar sensor 20 in the past.

In the present embodiment, the estimation device 50 stores in the memory 52, the positions of the plurality of observation points that was detected in the past by a process performed separately from this notification process and has a reflection intensity equal to or smaller than a detection threshold (hereinafter, called past points).

The estimation device 50 further calculates the amount of motion of the own vehicle 1 based on the velocity and the rotation angle indicating a change in the movement direction. The amount of motion indicates how much the own vehicle 1 has moved during the period from the detection of the past points to the current time. Based on the calculated amount of motion, the estimation device 50 estimates repeatedly the current positions of the past points as predicted positions at predetermined intervals and stores the same in the memory 52. The series of operations of storing the past points, calculating the amount of motion, and estimating and storing the predicted positions will be hereinafter called a cycle.

Accordingly, when there is an object including a plurality of same-object points at a position different from the predicted position, that is, at a position at a predetermined distance from the past points, the estimation device 50 determines that the object is a first-time detected object. The objects 70a to 70c illustrated in FIG. 4 are all represented as first-time detected objects.

When there exists no first-time detected object, the estimation device 50 advances the process to S25, and when there exists any first-time detected object, the estimation device 50 advances the process to S30.

In S25, the estimation device 50 calculates the relative velocity vector for the already detected object.

Specifically, the estimation device 50 specifies the current position and relative velocity vector of the already detected object based on the predicted positions in the one or more past cycles and the positions of the observation points in the current cycle, and stores the same in the memory 52. The current cycle refers to a series of operations currently performed by the estimation device 50. The past cycle refers to a series of operations performed by the estimation device 50 earlier than the current cycle.

Specifically, the estimation device 50 uses a α-β filter to estimate the current position of the already detected object from the predicated position and the positions of the observation points. The estimation device 50 also estimates the movement direction and the magnitude of the relative velocity of the already detected object from the current position of the already detected object in the current cycle and the current position of the already detected object in the past cycle stored in the memory 52, to thereby specify the relative velocity vector. The method for estimating the current position and relative velocity vector of the already detected object is not limited to this but any other well-known estimation method may be used such as the use of a Kalman filter, for example.

In S30, the estimation device 50 determines whether the relative direction of the object 70 as a first-time detected object is a direction toward the own vehicle 1. When the relative direction of the object 70 as a first-time detected object is a direction toward the own vehicle 1, the estimation device 50 advances the process to S35. On the other hand, when the relative direction of the object 70 as a first-time detected object is a direction away from the own vehicle 1, the estimation device 50 terminates the notification process.

In S35, the estimation device 50 performs an initial value process.

The initial value process refers to a process for, when the relative direction of the object 70 as a first-time detected object is a direction toward the own vehicle 1, estimating that a direction predetermined according to the object position of the object 70 as a first-time detected object is the movement direction of the object 70 as a first-time detected object. That is, the initial value process is a process for estimating the initial value of the movement direction of a first-time detected object approaching the own vehicle 1.

Figure 3:
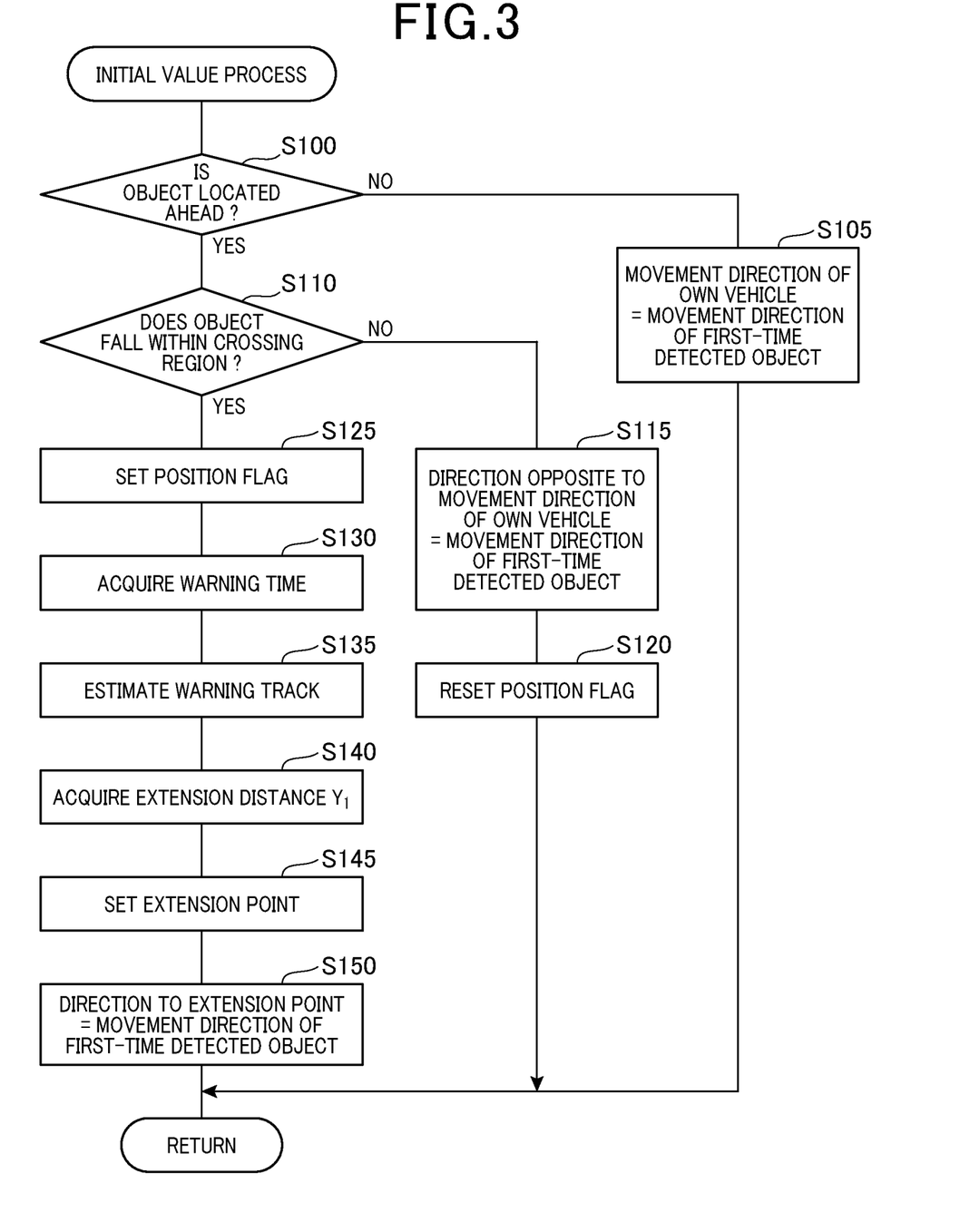
FIG. 3 is a flowchart of an initial value process.

The initial value process will be described with reference to the flowchart illustrated in FIG. 3.

In S100, the estimation device 50 determines whether the object 70 as a first-time detected object is located ahead of the own vehicle 1 based on the object position acquired in S15. In the following description of the initial value process, the object 70 as a first-time detected object will also be designated simply as object 70. When the object 70 is located ahead of the own vehicle 1, the estimation device 50 advances the process to S110, and when the object 70 is located behind the own vehicle 1, the estimation device 50 advances the process to S105.

In S105, the estimation device 50 estimates that a direction identical to the movement direction of the own vehicle 1 is the movement direction of the object 70. Specifically, since the object 70a illustrated in FIG. 4 is located behind the own vehicle 1, the estimation device 50 estimates that a direction identical to the movement direction of the own vehicle 1 is the movement direction of the object 70a. The estimation device 50 stores the estimated movement direction of the object 70 in the memory 52 and terminates the initial value process.

In S110, the estimation device 50 determines whether the object position of the object 70 falls within a crossing region. As illustrated in FIG. 4, the crossing region RT refers to a region that is located ahead of a reference plane K of the own vehicle 1 at a distance from the reference plane K shorter than a cross distance $Y_0$.

The reference plane K is a plane orthogonal to the movement direction of the own vehicle 1 that passes through a preset reference portion 101 of the own vehicle 1.

The reference portion 101 refers to a preset portion of the own vehicle 1. For example, the reference portion 101 may be a predetermined arbitrary portion of the own vehicle 1 such as the front end or rear end of the own vehicle 1. In the present embodiment, the reference portion 101 is set at the end of the front bumper of the own vehicle 1. However, the reference portion 101 is not limited to this.

The cross distance $Y_0$ is a predetermined arbitrary distance from the reference plane K. In the present embodiment, the cross distance $Y_0$ is set to the road width at a general intersection. However, the present disclosure is not limited to this.

When the object position falls within the crossing region RT, the estimation device 50 advances the process to S125. On the other hand, when the object position does not fall within the crossing region RT, the estimation device 50 advances the process to S115.

In S115, the estimation device 50 estimates that a direction opposite to the movement direction of the own vehicle 1 is the movement direction of the object 70. The outside region described below refers to the region that is located ahead of the reference plane K at a distance from the reference plane K equal to or longer than the cross distance $Y_0$.

Specifically, since the object 70b illustrated in FIG. 4 is located in the outside region, the estimation device 50 estimates that a direction opposite to the movement direction of the own vehicle 1 is the movement direction of the object 70b as a first-time detected object. The estimation device 50 stores the estimated movement direction of the object 70b in the memory 52.

In S120, since the object position of the object 70 does not fall within the crossing region RT, the estimation device 50 resets a position flag and terminates the initial value process.

In S125, the object position of the object 70 falls within the crossing region RT, and thus the estimation device 50 sets the position flag.

In S130, the estimation device 50 acquires a warning time. The warning time refers to a time preset for verifying whether the moving own vehicle 1 and the moving object 70 will approach each other. Approaching each other here means that the distance between the own vehicle 1 and the object becomes short to the degree that the own vehicle 1 and the object 70 may contact each other.

In the present embodiment, the warning time is set to several seconds. However, the present disclosure is not limited to this but the warning time may be set to an arbitrary time.

In S135, the estimation device 50 estimates a vehicle track 61 (hereinafter, called warning track) as illustrated in FIG. 4. In other words, the estimation device 50 detects the warning track. The warning track 61 is a track on which the own vehicle 1 travels from the own vehicle position P along the movement direction, that is, a track from the own vehicle position P to a warning point 62. The warning point 62 is the end of the warning track 61 opposite to the own vehicle position P. The warning point 62 indicates the position that is reached by the own vehicle 1 moving along the movement direction at the vehicle velocity acquired in S10 after a lapse of the warning time. The estimation device 50 stores the position of the warning point 62 in the memory 52.

In S140, the estimation device 50 acquires an extension distance $Y_1$. The extension distance $Y_1$ refers to a distance that is part of the track on which the own vehicle 1 travels from the own vehicle position P along the movement direction, and covers from the warning point 62 to the point reached by the own vehicle 1 after running for a predetermined time. The extension distance $Y_1$ can be set to an arbitrary value. The extension distance $Y_1$ is stored in advance in the memory 52.

In S145, the estimation device 50 sets an extension point. In the present embodiment, an extension point 63 refers to a point set ahead of the warning point 62, which is set forward of the extension distance $Y_1$ from the warning point 62 along the movement direction of the own vehicle 1 as illustrated in FIG. 4.

In S150, the estimation device 50 estimates that the direction from the object position toward the extension point 63 is the movement direction of the object. Specifically, since the object 70c illustrated in FIG. 4 falls within the crossing region RT, the estimation device 50 estimates that the direction from the object position $(x_3, y_3)$ of the object 70c toward the extension point 63 is the movement direction of the object 70. The estimation device 50 stores the movement direction of the object 70c in the memory 52 and terminates the initial value process.

As described above, in the initial value process, the estimated movement direction of the object 70 as a first-time detected object is stored in the memory 52. In addition, the warning track 61 is estimated and stored in the memory 52. When the object position of the object 70 as a first-time detected object falls within the crossing region RT, the position flag is set.

Returning to FIG. 2, in S40, the estimation device 50 calculates the relative velocity vector of the object 70 as a first-time detected object. Specifically, the estimation device 50 calculates the relative velocity vector based on the relative velocity of the object 70 specified as a first-time detected object in S15 and the movement direction of the object 70 as a first-time detected object estimated in the initial value process executed in S35.

FIG. 4 indicates relative velocity vectors Va to Vc of the objects 70a to 70c as first-time detected objects with thick-line arrows extending from the respective object positions of the objects 70a to 70c. FIG. 4 indicates the direction of the relative velocity vector V by the direction of the arrow and indicates the magnitude of the relative velocity vector V by the length of the arrow.

In S45, the estimation device 50 determines whether the object position of the object 70 falls within the crossing region RT described later. In the following description, the object includes both the first-time detected object and the already detected object unless otherwise specified.

When the position flag for the object 70 as a first-time detected object is set, the estimation device 50 determines that the object position falls within the crossing region RT. Meanwhile, the estimation device 50 determines in this step whether the object position of the already detected object acquired in S15 falls within the crossing region RT.

When the object position falls within the crossing region RT, the estimation device 50 advances the process to S50, and when the object position falls outside the crossing region RT, the estimation device 50 terminates the notification process.

In S50, the estimation device 50 estimates an object track. In other words, the estimation device 50 detects the object track. The object track refers to a track on which the object moves along the movement direction of the object, that is, a track to the point reached by the object after a lapse of a predetermined time (hereinafter, called reach point).

The predetermined time refers to a time preset for estimating the object track. In the present embodiment, the predetermined time is set to be equal to the warning time. However, the present disclosure is not limited to this but the predetermined time may be set to an arbitrary time such as a time longer than the warning time or a time shorter than the warning time.

This step is performed on the object 70c as a first-time detected object illustrated in FIG. 4 as described below. That is, the estimation device 50 calculates the point reached by the object 70c after moving for the warning time along the movement direction at the relative velocity calculated in S40, as a reach point 73. Then, the estimation device 50 estimates the track from the current position ($x_3$, $y_3$) of the object 70c to the reach point 73, as an object track 71. The estimation device 50 stores the current position ($x_3$, $y_3$) of the object 70c and the position of the reach point 73 in the memory 52.

Meanwhile, this step is performed on the already detected object in the same manner as described above. In this case, however, the estimation device 50 calculates the reach point by using the relative velocity and the movement direction calculated in S25 to estimate the object track.

In S55, the estimation device 50 acquires the warning track 61. Specifically, the estimation device 50 acquires from the memory 52 the position of the warning point 62 indicating the end of the warning track 61.

In S60, the estimation device 50 determines whether the object track 71 crosses the warning track 61. When the object track 71 crosses the warning track 61, the estimation device 50 advances the process to S65. On the other hand, when the object track 71 does not cross the warning track 61, the estimation device 50 terminates the notification process.

In S65, the estimation device 50 instructs the display and the speaker in the drive assist execution unit 40 to make a notification for warning the driver about the approach of the object 70c toward the own vehicle 1. After the provision of the instruction, the estimation device 50 terminates the notification process.

As described above, the estimation device 50 is configured to, when the object including the first-time detected object and the already detected object falls within the crossing region RT and is approaching toward the own vehicle 1, provide an instruction for making a notification to warn the driver.

3. Advantageous Effects

According to the first embodiment described above in detail, the following advantageous effects can be obtained.

(3a) In S15, the estimation device 50 acquires the object information about an object having reflected a radar wave including the object position indicating the position specified by the distance and azimuth to the own vehicle 1 and the relative direction indicating the movement direction relative to the own vehicle 1. In S20, the estimation device 50 determines whether the object 70 is a first-time detected object that is detected for the first time.

In S30, when the object 70 is a first-time detected object, the estimation device 50 determines whether the acquired relative direction is a direction toward the own vehicle 1. In S35, when the acquired relative direction is a direction closer to the own vehicle 1, the estimation device 50 estimates that a direction predetermined according to the object position is the movement direction of the object.

As a result, since the estimation device 50 estimates that the direction predetermined according to the detected object position is the movement direction of the object, it is possible to shorten the time for estimating the movement direction of the object 70 as a first-time detected object.

(3b) In S105, when the object position is located behind the reference plane K, the estimation device 50 estimates that a direction identical to the movement direction of the own vehicle 1 is the movement direction of the object 70a.

As a result, since the estimation device 50 estimates that the direction predetermined according to the object position is the movement direction of the object 70a, it is possible to estimate the movement direction of the first-time detected object in a short time.

(3c) In S120, when the object position falls within the region that is located ahead of the reference plane K at a distance from the reference plane K that is equal to or longer than the cross distance $Y_0$ indicating the predetermined distance, the estimation device 50 estimates that the direction opposite to the movement direction of the own vehicle 1 is the movement direction of the object 70b.

As a result, the estimation device 50 estimates that the direction predetermined according to the object position is the movement direction of the object 70b, which provides the same advantageous effects as described above in (3b).

(3d) The estimation device 50 also acquires the relative velocity in S15 and acquires the warning time in S130. In S135, the estimation device 50 estimates the track to the warning point 62 as the warning track 61. In S50, the estimation device 50 estimates the track on which the object 70c moves, that is, the track to the point reached by the object 70c after a lapse of a predetermined time, as the object track 71. In S65, when the object track 71 crosses the warning track 61, the estimation device 50 instructs the speaker and the display in the drive assist execution unit 40 to make a notification.

As a result, a notification is made when the object 70c approaches the own vehicle 1 within the warning time, which makes it possible to warn the driver about the approach of the first-time detected object.

(3e) In S110, the estimation device 50 determines whether the object position falls within the crossing region RT that is located ahead of the reference plane K at the distance from the reference plane K shorter than the cross distance $Y_0$ and indicating a predetermined distance. In S65, when the object 70c falls within the crossing region RT and the object track 71 crosses the warning track 61, the estimation device 50 instructs the drive assist execution unit 40 to make a notification.

As a result, when the object position of the first-time detected object falls within the crossing region RT, the object may approach the own vehicle 1 and thus the estimation device 50 can make an appropriate notification to warn the driver.

(3f) In S150, the estimation device 50 may estimate that the direction from the object position toward the extension point 63 is the movement direction of the object 70c. As a result, the estimation device 50 can suppress a false notification action. A false notification action means the action of providing an incorrect notification to warn the driver about the approach of an object while the own vehicle 1 is moving in the movement direction during the warning time, although the own vehicle 1 and the object actually are not approaching toward each other. The false notification action will be described with reference to FIG. 5.

Figure 5:
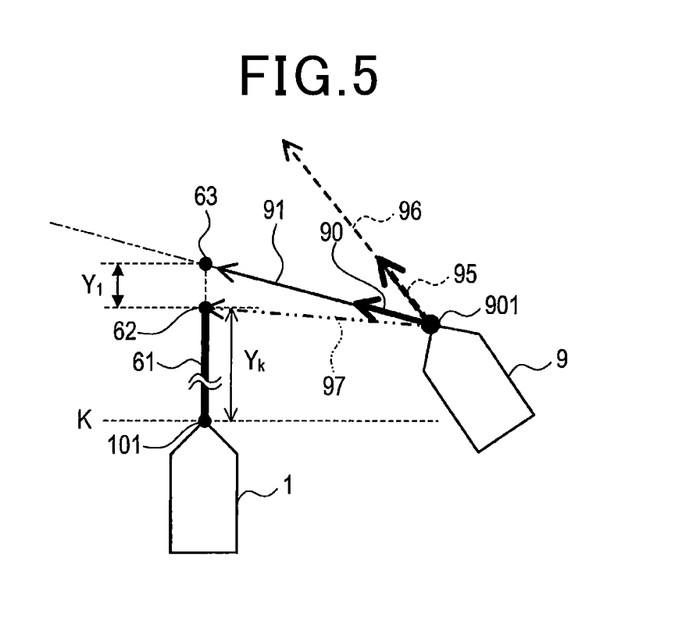
FIG. 5 is a diagram describing suppression of a false notification action.

Referring to FIG. 5, an object 9 is a first-time detected object within the crossing region RT. The arrow having the thick solid line extending from a current position 901 of the object 9 indicates a relative velocity vector 90 of the object 9 based on the movement direction estimated by the estimation device 50. The arrow having the thin solid line extending from the current position 901 of the object 9 indicates an object track 91.

The arrow having the thick dotted line extending from the current position 901 of the object 9 indicates an actual relative velocity vector 95 of the object 9. The arrow having the thin dotted line extending from the current position 901 of the object 9 indicates an actual track 96. The actual track 96 refers to the track on which the object 9 actually moved for the warning time.

It is here assumed that a comparative example configured in the same manner as the estimation device 50 estimates that the direction from the current position 901 of the object 9 toward the warning point 62 is the movement direction of the object. In this case, the object track 97 is estimated as indicated by the arrow having the two-dot chain line in FIG. 5.

In the example of FIG. 5, the actual track 96 of the object 9 does not cross the warning track 61, and thus it is not considered that the object 9 and the own vehicle 1 will actually approach toward each other within the warning time. However, the object track 97 based on the movement direction estimated by the comparative example crosses the warning track 61 and thus the comparative example makes a notification about the possibility of approach of the object within the warning time. Such a false notification action may be annoying for the driver.

Thus, in the present embodiment, the estimation device 50 estimates that the direction toward the extension point 63 is the movement direction of the object 70c. Accordingly, the estimation device 50 can suppress a false notification action to reduce annoyance that might be felt by the driver at a false notification.

In the present embodiment, the estimation device 50 corresponds to an information acquisition unit, a detection determination unit, a direction determination unit, a direction estimation unit, an object estimation unit, a notification control unit, a position determination unit, a time acquisition unit, and an own vehicle estimation unit. The drive assist execution unit 40 corresponds to a notification unit.

S15 corresponds to a process executed by the information acquisition unit, S20 corresponds to a process executed by the detection determination unit, S30 corresponds to a process executed by the direction determination unit, S35, S105, S115, and S150 correspond to a process executed by the direction estimation unit, and S45 corresponds to a process executed by the position determination unit. S50 corresponds to a process executed by the object estimation unit, S65 corresponds to a process executed by the notification control unit, S130 corresponds to a process executed by the time acquisition unit, and S135 corresponds to a process executed by the own vehicle estimation unit.

4. Other Embodiments

Embodiment for carrying out the present disclosure has been described so far. However, the present disclosure is not limited to the foregoing embodiment but can be carried out in various modified manners.

(4a) In the foregoing embodiment, the object position is indicated by coordinates with an origin point at the own vehicle position P, but the present disclosure is not limited to this. For example, the object position may be indicated by absolute coordinates. The object position indicates at least the distance from the reference plane K to a plane perpendicular to the movement direction of the own vehicle 1 and passing through the position of the object.

(4b) In the foregoing embodiment, the extension distance $Y_1$ is set to an arbitrary value. However, the extension distance $Y_1$ may be zero. That is, the warning point 62 in the warning track 61 may be set to the extension point 63, and the direction from the object position toward the warning point 62 may be estimated as the movement direction of the first-time detected object.

(4c) In the foregoing embodiment, the reference portion 101 is set at the end of the front bumper of the own vehicle 1, but the present disclosure is not limited to this. The reference portion 101 may be set at an arbitrary portion in the own vehicle 1 such as the end of the rear bumper of the own vehicle 1 or the barycentric position of the own vehicle 1, for example.

(4d) In the foregoing embodiment, only when the object position falls within the crossing region RT, it is determined whether to notify the mutual approach of the own vehicle 1 and the object and the notification is provided according to the condition, but the present disclosure is not limited to this. Even when the object position of the object falls outside the crossing region RT, it may be determined whether to provide the notification and the notification may be provided according to this condition.

In the foregoing embodiment, when the object position falls within the crossing region RT, it is estimated that the direction from the object position toward the extension point 63 is the movement direction, but the present disclosure is not limited to this. Even when the object position falls outside the crossing region RT, it may be estimated that the object position toward the extension point 63 is the movement direction.

(4e) In the foregoing embodiment, it is estimated that the direction toward the extension point 63 is the movement direction, but the present disclosure is not limited to this. It may be estimated that the direction toward the warning point 62 is the movement direction. It may also be estimated that the direction toward the own vehicle 1 and perpendicular to the movement direction of the own vehicle 1 is the movement direction. The warning time may be set to an arbitrary time including zero. The warning distance Yk may be set to an arbitrary distance including zero. The warning distance Yk is represented as the length of the warning track 61 in the drawings.

(4f) In the foregoing embodiment, the radar sensor 20 is installed in the front bumper of the own vehicle and oriented in the direction such that the area ahead of the own vehicle falls within the detection range, but the present disclosure is not limited to this. The radar sensor 20 may be provided at least at one of the right and left ends of the front side of the own vehicle, for example. The radar sensor 20 may be installed on the rear side of the own vehicle, for example. In this case, the radar sensor 20 may be provided in the center of the rear part of the own vehicle or may be provided at least at one of the right and left ends of the rear part.

(4g) A plurality of functions possessed by one constituent element in the foregoing embodiment may be implemented by a plurality of constituent elements, or one function possessed by one constituent element may be implemented by a plurality of constituent elements. In addition, a plurality of functions possessed by a plurality of constituent elements may be implemented by one constituent element or one function implemented by a plurality of constituent elements may be implemented by one constituent element. Some of the components in the foregoing embodiment may be omitted. At least some of the components in the foregoing embodiment may be added to or replaced by the components of other embodiments. The embodiment of the present disclosure includes all aspects in the technical ideas specified only by the description of the claims.

(4h) The present disclosure can be implemented in various modes including the estimation device 50 and the drive assist system 10 described above, a program for causing the estimation device 50 to perform functions, a non-transitory tangible computer readable storage medium such as a semiconductor memory storing this program, and an estimation method.

The invention claimed is:

1. An estimation device comprising:
    an information acquisition unit configured to acquire object information including (i) an object position that indicates a position of an object having reflected a radar wave, (ii) a relative direction indicating a movement direction of the object relative to the own vehicle, and (iii) a relative velocity of the object indicating a velocity relative to the own vehicle, the object position being specified by (a) a distance between the object and the own vehicle, and (b) an azimuth of the object to the own vehicle;
    a detection determination unit configured to determine whether the object is a first-time detected object that is an object detected for a first time;
    a direction determination unit configured to, in response to determining that the object is the first-time detected object, determine whether the relative direction acquired by the information acquisition unit is toward the own vehicle; and
    a direction estimation unit configured to, in response to determining that the relative direction is toward the own vehicle, estimate that a direction predetermined according to the object position is the movement direction of the object;
    a time acquisition unit configured to acquire a warning time, which is predetermined;
    an own vehicle estimation unit configured to estimate a track on which the own vehicle travels, which is a track to a warning point indicating a position reached by the own vehicle after a lapse of the warning time, as a warning track;
    an object estimation unit configured to estimate a track on which the object travels, which is an object track to a point reached by the object after a lapse of a predetermined time, based on the movement direction of the object and the relative velocity acquired by the information acquisition unit; and
    a notification control unit configured to, when the object track crosses the warning track, cause a notification unit to make a notification.

2. The estimation device according to claim 1, wherein the direction estimation unit is configured to, in response to determining that the object position acquired by the information acquisition unit is located behind a plane that is orthogonal to a movement direction of the own vehicle and passes through a preset reference portion of the own vehicle, estimate that a direction identical to the movement direction of the own vehicle is the movement direction of the object.

3. The estimation device according to claim 1, wherein the direction estimation unit is configured to, in response to determining that the object position acquired by the information acquisition unit falls within a region ahead of a reference plane that indicates a plane orthogonal to the movement direction of the own vehicle and passes through a preset reference portion of the own vehicle at a distance from the reference plane equal to or longer than a cross distance indicating a predetermined distance, estimate that a direction opposite to the movement direction of the own vehicle is the movement direction of the object.

4. The estimation device according to claim 1, further comprising
    a position determination unit configured to determine whether the object position falls within a crossing region ahead of a reference plane that is orthogonal to the movement direction of the own vehicle and indicates a plane passing through a preset reference portion of the own vehicle at a distance from the reference plane shorter than a cross distance indicating a predetermined distance, wherein
    the notification control unit is configured to, in response to determining that the object falls within the crossing region and the object track crosses the warning track, cause the notification control unit to make a notification.

5. The estimation device according to claim 1, wherein the direction estimation unit is configured to estimate that a direction toward an extension point indicating a point set ahead of the warning point is the movement direction.

6. A computer-implemented method for estimating a movement direction of an object relative to an own vehicle, the method comprising:
    acquiring object information from a radar sensor, the object information including (i) an object position that indicates a position of an object having reflected a radar wave transmitted by the radar sensor, (ii) a relative direction indicating a movement direction of the object relative to an own vehicle, and (iii) a relative velocity of the object indicating a velocity relative to the own vehicle, the object position being specified by (a) a distance between the object and the own vehicle, and (b) an azimuth of the object to the own vehicle;
    determining whether the object is a first-time detected object that is an object detected for a first time;
    determining whether the relative direction is a direction toward the own vehicle in response to determining that the object is the first-time detected object;
    estimating that a predetermined direction according to the object position is the movement direction of the object in response to determining that the relative direction is a direction toward the own vehicle;
    acquiring a warning time, which is predetermined;
    estimating a track on which the own vehicle travels, which is a track to a warning point indicating a position reached by the own vehicle after a lapse of the warning time, as a warning track;
    estimating a track on which the object travels, which is an object track to a point reached by the object after a lapse of a predetermined time, based on the movement direction of the object and the relative velocity acquired, and
    cause a notification to be generated for a state in which the object track crosses the warning track.

* * * * *